(12) United States Patent
Nguyen et al.

(10) Patent No.: US 12,361,947 B2
(45) Date of Patent: *Jul. 15, 2025

(54) AUTOMATED ASSISTANT INTERACTION PREDICTION USING FUSION OF VISUAL AND AUDIO INPUT

(71) Applicant: GOOGLE LLC, Mountain View, CA (US)

(72) Inventors: Tuan Nguyen, San Jose, CA (US); Yuan Yuan, Redwood City, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/383,314

(22) Filed: Oct. 24, 2023

(65) Prior Publication Data

US 2024/0055003 A1    Feb. 15, 2024

Related U.S. Application Data

(63) Continuation of application No. 17/211,409, filed on Mar. 24, 2021, now Pat. No. 11,842,737.

(51) Int. Cl.
*G10L 15/24* (2013.01)
*G06F 3/01* (2006.01)
(Continued)

(52) U.S. Cl.
CPC .............. *G10L 15/24* (2013.01); *G06F 3/013* (2013.01); *G06F 18/251* (2023.01); *G06N 3/04* (2013.01);
(Continued)

(58) Field of Classification Search
CPC ... G10L 15/24; G10L 15/16; G10L 2015/228; G10L 25/78; G06F 3/013; G06F 18/251; G06N 3/04; G06N 3/045; G06N 3/08
See application file for complete search history.

(56) References Cited

U.S. PATENT DOCUMENTS 10,522,134 B1 * 12/2019 Matsoukas .............. G10L 15/30
2011/0184735 A1    7/2011 Flaks
(Continued)

FOREIGN PATENT DOCUMENTS

CN    112188306        1/2021
WO    2020040745       2/2020

OTHER PUBLICATIONS

Jung, H.; Tell me more: Understanding user interaction of smart speaker news powered by conversational search; In Extended abstracts of the 2019 chi conference on human factors in computing systems; pp. 1-6; dated 2019.
(Continued)

*Primary Examiner* — Bhavesh M Mehta
*Assistant Examiner* — Philip H Lam
(74) *Attorney, Agent, or Firm* — Gray Ice Higdon

(57) ABSTRACT

Techniques are described herein for detecting and/or enrolling (or commissioning) new "hot commands" that are useable to cause an automated assistant to perform responsive action(s) without having to be first explicitly invoked. In various implementations, an automated assistant may be transitioned from a limited listening state into a full speech recognition state in response to a trigger event. While in the full speech recognition state, the automated assistant may receive and perform speech recognition processing on a spoken command from a user to generate a textual command. The textual command may be determined to satisfy a frequency threshold in a corpus of textual commands. Consequently, data indicative of the textual command may be enrolled as a hot command. Subsequent utterance of another textual command that is semantically consistent with the textual command may trigger performance of a responsive action by the automated assistant, without requiring explicit invocation.

17 Claims, 5 Drawing Sheets

(51) Int. Cl.
*G06F 18/25* (2023.01)
*G06N 3/04* (2023.01)
*G10L 15/16* (2006.01)
*G10L 15/22* (2006.01)

(52) U.S. Cl.
CPC ........ *G10L 15/16* (2013.01); *G10L 2015/228* (2013.01)

(56) References Cited

U.S. PATENT DOCUMENTS

| | | | |
|---|---|---|---|
| 2012/0213490 A1* | 8/2012 | Steiner | G06V 40/168 386/E9.011 |
| 2013/0110804 A1* | 5/2013 | Davis | G06F 16/9032 707/706 |
| 2015/0088515 A1 | 3/2015 | Beaumont | |
| 2015/0348548 A1* | 12/2015 | Piernot | G10L 15/22 704/235 |
| 2018/0357221 A1* | 12/2018 | Galitsky | G06F 40/289 |
| 2019/0333516 A1 | 10/2019 | Lin | |
| 2019/0348030 A1 | 11/2019 | Anders | |
| 2019/0371327 A1 | 12/2019 | Quinn et al. | |
| 2020/0041803 A1* | 2/2020 | Reyes | G06V 40/10 |
| 2020/0252471 A1* | 8/2020 | Chauhan | H04N 21/44226 |
| 2020/0296521 A1* | 9/2020 | Wexler | G06F 3/167 |
| 2020/0342855 A1* | 10/2020 | Casado | G10L 15/183 |
| 2020/0349966 A1* | 11/2020 | Konzelmann | G06F 40/20 |
| 2021/0090578 A1* | 3/2021 | Trapp | G06F 21/32 |
| 2021/0210096 A1* | 7/2021 | Miyazaki | G06F 16/90332 |
| 2022/0172021 A1 | 6/2022 | Duy | |
| 2022/0293125 A1* | 9/2022 | Maddika | G10L 25/51 |
| 2022/0310094 A1 | 9/2022 | Nguyen et al. | |

OTHER PUBLICATIONS

Natarajan, Pradeep et al.; New Alexa features: Natural turn-taking; Amazon Science; 7 pages; dated Sep. 24, 2020.

Kepuska, et al.; Next-generation of virtual personal assistants (microsoft cortana, apple siri, amazon alexa and google home) 2008 IEEE 8th annual computing and communication workshop and conference; pp. 99-103; dated 2018.

Kampman et al.; Investigating audio, visual, and text fusion methods for end-to-end automatic personality prediction. arXiv preprint arXiv:1805.00705; dated 2018.

Jaafar et al.; Audio-Visual Fusion for Aggression Detection Using Deep Neural Networks. In 2019 International Conference on Control, Automation and Diagnosis (ICCAD) (pp. 1-5). IEEE; dated Jul. 2019.

Zhang et al.; Learning affective features with a hybrid deep model for audio-visual emotion recognition. IEEE Transactions on Circuits and Systems for Video Technology, 28(10). 3030-3043; dated 2017.

* cited by examiner

AUTOMATED ASSISTANT INTERACTION PREDICTION USING FUSION OF VISUAL AND AUDIO INPUT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests using free form natural language input which may include vocal utterances converted into text and then processed and/or typed free form natural language input.

In many cases, before the automated assistant can interpret and respond to a user's request, it must first be "invoked," e.g., using predefined oral invocation phrases that are often referred to as "hot words" or "wake words." Thus, many automated assistants operate in what will be referred to herein as a "limited listening state" or "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "full listening state" wherein for at least some time interval after invocation, the automated assistant performs speech-to-text ("STT") processing (also referred to as "speech recognition processing") of audio data sampled by a microphone to generate textual input, which in turn is semantically processed to determine and/or fulfill a user's intent.

Operating the automated assistant in the default listening state provides a variety of benefits. Limiting the number of hot words being "listened for" allows for conservation of power and/or computing resources. For example, an on-device machine learning model may be trained to generate output that indicates when one or more hot words are detected. Implementing such a model may require only minimal computing resources and/or power, which is particularly beneficial for assistant devices that are often resource-constrained. Along with these benefits, operating the automated assistant in the limited hot word listening state also presents various challenges. To avoid inadvertent invocation of the automated assistant, hot words are typically selected to be words or phrases that are not often uttered in everyday conversation (e.g., "long tail" words or phrases). However, there are various scenarios in which requiring users to utter long tail hot words before invoking an automated assistant to perform some action can be cumbersome.

SUMMARY

Techniques are described herein for determining whether detected voice activity or various physical movements of a user represent an intent to interact with an automated assistant or automated assistant device. These determinations can be made when the user provides audio and/or visual input to the automated assistant device without requiring that the automated assistant first be explicitly invoked and transitioned into a fully listening/responsive state in which the automated assistant attempts to respond to any captured utterance.

In some implementations, speech recognition or image recognition may be implemented wholly or at least partially onboard a client device such as a standalone interactive speaker, which may or may not also include other components such as a display, a camera, and/or other sensors. In some such implementations, the automated assistant may perform speech recognition processing on spoken utterances captured at time(s) other than immediately after the automated assistant is invoked. These other times may include, for instance, whenever a user is detected in proximity to the computing device, whenever user speech is detected and determined to not originate from another machine, such as a television or radio, and so forth.

The audio and visual features of the captured user input may be analyzed using techniques described herein to determine whether they should trigger responsive action by the automated assistant, or should be ignored or discarded. In many implementations, techniques described herein may be performed locally on the client device, thereby avoiding transmission of the textual snippets to a cloud-based system.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
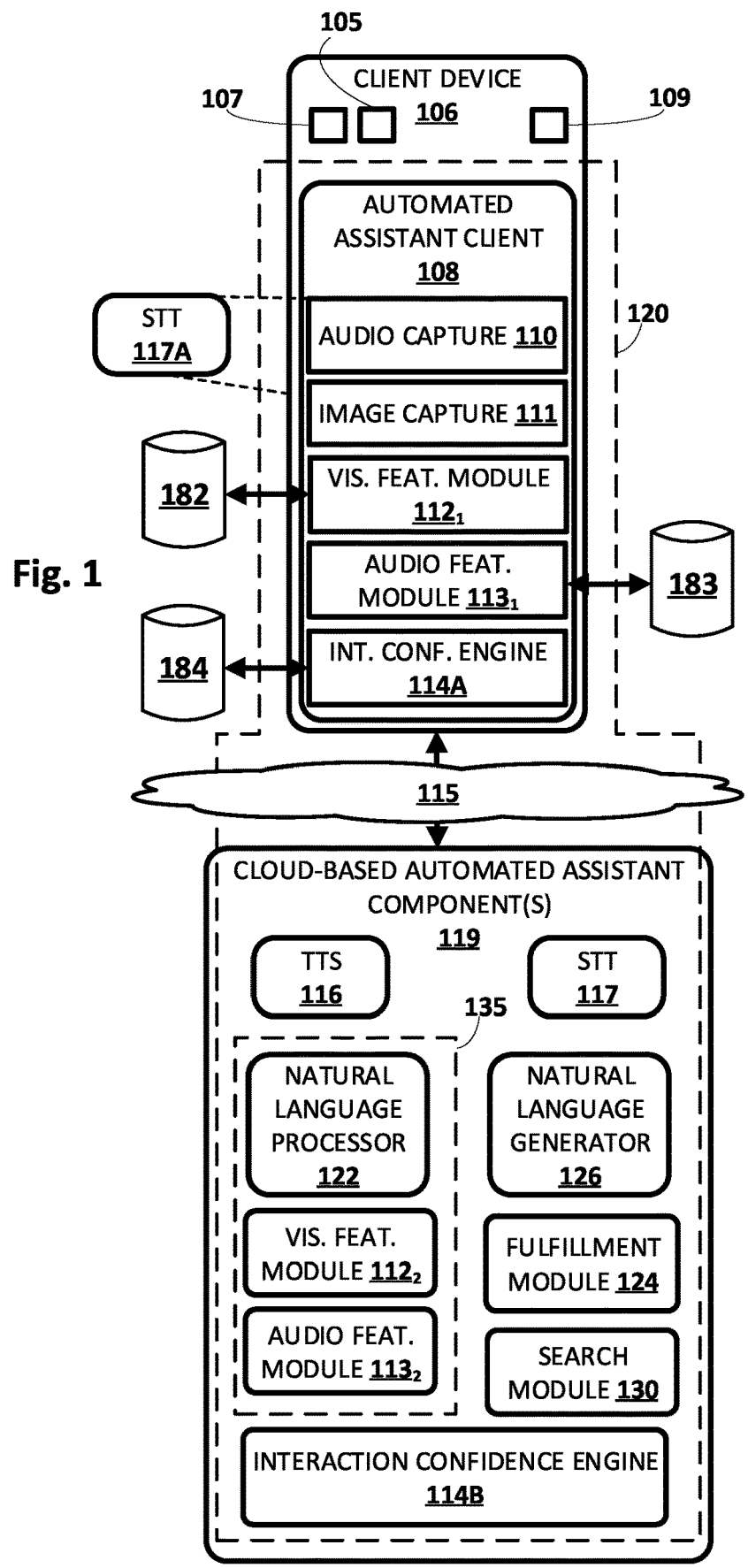
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 115.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a stand-alone interactive speaker with an attached display, which may or may not be a touchscreen display.

In some implementations, client device 106 may be equipped with one or more vision sensors 107 having one or more fields of view, although this is not required. In other implementations, the vision sensors 107 may be remote from but in communication with the client device 106. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual feature module $112_1$, to detect the presence of user-provided visual features contained in the image frames. These visual features may include but are not limited to hand gestures, gazes towards particular reference points, facial expressions, predefined movements by users, etc. These detected visual features may be used for various purposes, such as invoking automated assistant 120 and/or causing automated assistant 120 to take various actions.

Additionally or alternatively, in some implementations, client device 106 may include one or more proximity sensors 105. Proximity sensor(s) may take various forms, such as passive infrared ("PIR") sensors, radio frequency identification ("RFID"), a component that receives a signal emitted from another nearby electronic component (e.g., Bluetooth signal from a nearby user's client device, high- or low-frequency sounds emitted from the devices, etc.), and so forth. Additionally or alternatively, vision sensors 107 and/or a microphone 109 may also be used as proximity sensors, e.g., by visually and/or audibly detecting that a user is proximate.

As described in more detail herein, automated assistant 120 performs one or more automated assistant functions for one or more users. One or more of these automated assistant functions can cause automated assistant 120 to engage in human-to-computer dialog sessions or otherwise interact with one or more users via user interface input and output devices of one or more client devices 106. The automated assistant functions can include, for example, generating and providing a response to user(s) and/or controlling one or more application(s) and/or smart device(s). The automated assistant functions associated with automated assistant 120 may be performed locally (e.g., by automated assistant client 108) or initiated locally and performed remotely (e.g., by one or more cloud-based automated assistant components 119). In some implementations, automated assistant functions may be performed using one or more of the local components of automated assistant client 108 as well as one or more of the remote, cloud-based automated assistant components 119.

In some implementations, automated assistant 120 may perform one or more automated assistant functions on behalf of or for a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation ("hot" or "wake") phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual features, alone or in combination with the predetermined oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and perform one or more automated assistant functions in response to certain terms being present in the user interface input and/or based on other audio features. In many implementations, automated assistant 120 may utilize speech recognition to convert utterances from users into text, and respond to the text accordingly, e.g., by providing search results, general information, and/or taking one or more other responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, the aforementioned visual feature module $112_1$, an audio feature module $113_1$, and/or an interaction confidence engine 114A. In other implementations, one or more aspects of speech capture module 110, image capture module 111, visual feature module 112, audio feature module 113, and/or interaction confidence engine 114A may be implemented (in whole or in part) separately from automated assistant client 108. e.g., by one or more counterpart cloud-based automated assistant components 119. For example, in FIG. 1, there is also a cloud-based visual feature module $112_2$ that may detect visual features in image frame(s) and an audio feature module $113_2$ that may detect audio features in audio data.

In various implementations, speech capture module 110, which may be implemented using any combination of hardware and software, may interface with hardware such as a microphone 109 or other pressure sensor to capture an audio recording of a user's utterance(s). In some implementations, the utterances may be stored at least temporarily as audio data in a buffer, such as a ring buffer. Various types of processing may be performed on this audio recording for various purposes. In some implementations, image capture module 111, which may be implemented using any combination of hardware or software, may be configured to interface with vision sensor 107 to capture one or more image frames (e.g., digital photographs) that correspond to a field of view of the vision sensor 107.

In various implementations, visual feature module $112_1$ (and/or cloud-based visual feature module $112_2$) may be implemented using any combination of hardware or software, and may be configured to analyze one or more image frames provided by image capture module 111 to detect one or more visual features captured in and/or across the one or more image frames. Visual feature module $112_1$ may employ a variety of techniques to detect visual features of the image frames. For example, visual feature module $112_2$ may use one or more neural network models that are trained to generate output indicative of detected visual features provided by users and captured in the image frames. Such visual features data may include: one or more bounding boxes corresponding to portions of the image frame(s), a predicted direction or location of a user who provided voice activity relative to the client device 106, image recognition data (e.g., object recognition data, gaze direction data, etc.), indications of changes in visual features between two or more consecutive image frames of the stream of captured image frames (e.g., user physical gestures, user mouth movements, or changes in gaze direction, user position or pose, distance or proximity to a user, etc.), and/or face recognition data (e.g., a temporary face recognition profile to compare to one or more known face recognition profiles and/or confidence level(s) for such a temporary face recognition profile matching the known face recognition profile(s)). These neural network models may be stored locally on client device 106, or may be stored in one or more databases communicatively connected to visual feature module $112_1$ (and/or cloud-based visual feature module $112_2$), such as database 182.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques (also referred to herein as "speech recognition processing"). As shown in FIG. 1, in some implementations, speech capture module 110 may include an onboard STT module 117A that is used in addition to, or instead of, the below-described cloud-based STT module 117. Additionally or alternatively, in some implementations, speech capture module 110 may be configured to perform text-to-speech ("TTS") processing to convert text to computer-synthesized speech, e.g., using one or more voice synthesizers.

However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

In various implementations, audio feature module $113_1$ (and/or cloud-based audio feature module $113_2$) may be implemented using any combination of hardware or software, and may be configured to analyze audio data provided by speech capture module 110 to detect one or more audio features captured in the audio data. Audio feature module $113_1$ may employ a variety of techniques to detect audio features. For example, audio feature module $113_2$ may use one or more neural network models that are trained to generate output indicative of detected audio features provided by users and captured in the audio data. Such audio features may include one or more of: audio spectrograms corresponding to the audio data, a predicted direction or location of a user who provided voice activity relative to the client device 106, audio spectrograms corresponding to human speech detected in the audio data, voice recognition data (e.g., a temporary voice profile to compare to one or more known voice profiles and/or confidence level(s) for such a temporary voice profile matching the known voice profile(s)), and speech recognition data (e.g., one or more transcriptions or various types of data resulting from natural language processing of such transcription(s)). These neural network models may be stored locally on client device 106, or may be stored in one or more databases communicatively connected to audio feature module $113_1$ (and/or cloud-based audio feature module $113_2$), such as database 183.

In various implementations, interaction confidence engine 114A may be configured to determine whether to invoke automated assistant 120 to perform one or more automated assistant functions, e.g., based on output(s) provided by audio feature module $113_1$ and/or by visual feature module $112_1$. Interaction confidence engine 114A can process the output(s) of audio feature module $113_1$ and/or by visual feature module $112_1$ using one or more neural network models to generate indications of one or more users determined to be present in the stream of image frames or the audio data and a confidence level for each user. The confidence levels of the users can indicate a level of confidence that a corresponding user intended to invoke and/or interact with automated assistant 120. Interaction confidence engine 114A can use these indications of present users and corresponding confidence levels to determine whether a user's utterance was intended to cause automated assistant 120 to perform one or more automated assistant functions. The neural network model(s) and/or indications of the interaction confidence levels of the users may be stored locally on client device 106, or may be stored in one or more databases communicatively connected to interaction confidence engine 114A (and/or cloud-based interaction confidence engine 114B), such as database 184.

In some implementations, interaction confidence engine 114A may analyze one or more audio features detected by audio feature module $113_1$ along with one or more visual features detected by visual feature module $112_1$. In some implementations, a confidence level threshold that is employed by interaction confidence engine 114A to determine whether to invoke automated assistant 120 in response to particular audio features may be lowered when particular visual features are also detected. Consequently, even when a user provides a vocal utterance that excludes a proper invocation phrase (e.g., "OK assistant"), that utterance may nonetheless be operable to invoke automated assistant 120 to perform one or more automated assistant functions when detected in conjunction with a visual feature (e.g., hand waving by the speaker, speaker gazes directly into vision sensor 107, etc.).

In some implementations, one or more on-device invocation models may be used by interaction confidence engine 114A to determine whether an utterance and/or certain visual feature(s) were meant to invoke automated assistant 120. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual features captured contemporaneously with the utterance. In some such implementations, the on-device invocation model may generate output in the form of a probability p that a captured utterance constitutes an invocation phrase meant to awaken automated assistant 120.

In some implementations, a default on-device invocation model may be trained to detect, in an audio recording or other data indicative thereof, one or more default invocation phrases or hot word(s), such as those mentioned previously (e.g., "OK Assistant," "Hey, Assistant," etc.). In some such implementations, these models may always be available and usable to transition automated assistant 120 into a full listening state in which any audio recording captured by speech capture module 110 (at least for some period of time following invocation) may be processed using other components of automated assistant 120 as described below (e.g., on client device 106 or by one or more cloud-based automated assistant components 119).

Additionally, in some implementations, interaction confidence engine 114A can use one or more additional contextual invocation models. These contextual invocation models may be used by and/or available to (e.g., activated by) interaction confidence engine 114A in specific contexts. The contextual invocation models may be trained to detect, e.g., in audio data and/or image frame(s), one or more audio and/or visual features that indicate a level of confidence that a user intended to invoke or interact with automated assistant 120. In some implementations, the contextual invocation models may be selectively downloaded on an as-needed basis, e.g., from interaction confidence engine 114B in FIG. 1 which forms part of cloud-based automated assistant components 119 but can also be implemented in whole or in part on client device 106, as will be described in more detail below.

In various implementations, when interaction confidence engine 114A detects various audio and/or visual features in the audio data or image frame(s) using the contextual invocation models, it may transition automated assistant 120 into the full listening state described previously. Additionally or alternatively, interaction confidence engine 114A may transition automated assistant 120 into a context-specific state in which one or more responsive automated assistant functions are performed with or without transitioning automated assistant 120 into the general listening state. In many cases, the audio and/or visual features that triggered transition of automated assistant 120 into a context-specific state may not be transmitted to the cloud. Instead, one or more responsive automated assistant functions may be performed entirely on client device 106, which may reduce both the response time and the amount of information that is transmitted to the cloud, which may be beneficial from a privacy standpoint.

In some implementations, client device 106 may store one or more neural network models locally, such as those used by audio feature module $113_1$, visual feature module $112_1$, and/or interaction confidence engine 114A. In such implementations, interaction confidence engine 114A may participate in a federated learning process to improve aspects of the present disclosure for invoking automated assistant 120 without hot/wake words. For example, interaction confidence engine 114A may determine corrections relevant to previous determinations of interaction confidence levels, intents to interact with automated assistant 120, audio features, and visual features based on subsequently captured user interface input, including subsequently captured audio data and/or image frames. For instance, interaction confidence engine 114A may generate a correction instance for a first potential interaction with automated assistant 120 in which it was determined that the user did not intend to interact with automated assistant 120 when the same user provides related second user input within a threshold period of time. In some implementations, interaction confidence engine 114A may generate a gradient based on one or more of these correction instances, which may be transmitted to interaction confidence engine 114B to update one or more layers of corresponding global copies of the neural network models that are stored remotely from client device 106. Interaction confidence engine 114B, or another module or device accessible to interaction confidence engine 114B, may then provide the update to the global copy or a new, combined global copy to one or more of the client devices of the user, or of one or more of a plurality of other users. Client devices that receive the update may then use the combined neural network model(s) when making the relevant determinations and decisions.

In some implementations, automated assistant 120, and more particularly, speech capture module 110, may perform STT processing on utterances that are detected under circumstances other than contemporaneously with a pre-determined oral invocation phrase of automated assistant 120. For example, in some implementations, speech capture module 110 may perform STT processing on all captured utterances, on utterances that are captured in particular contexts, and so forth. The text generated from this STT processing may then be analyzed by various components described herein to, for instance, invoke automated assistant 120, perform various automated assistant functions, and so forth.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected audio and/or visual features.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as intent matcher 135, TTS module 116, STT module 117, etc., may be implemented at least on part on client devices 106 (e.g., to the exclusion of the cloud).

In some implementations, automated assistant 120 performs one or more automated assistant functions in response to various inputs generated by a user of one of the client devices 106 during an interaction with automated assistant 120. Automated assistant 120 may perform the one or more automated assistant functions for or on behalf of the user to continue or complete the interaction between the user and automated assistant 120. For example, automated assistant 120 may generate responsive content in response to free-form natural language input provided via client device 106. As used herein, free-form input is input that is formulated by a user and that is not constrained to a group of options presented for selection by the user.

An intent matcher 135 may be configured to determine a user's intent based on input(s) (e.g., vocal utterances, visual features, etc.) provided by the user and/or based on other signals, such as sensor signals, online signals (e.g., data obtained from web services), and so forth. In some implementations, intent matcher 135 may include a natural language processor 122 and the aforementioned cloud-based visual feature module $112_2$ and cloud-based audio feature module $113_2$. In various implementations, one or more of cloud-based visual feature module $112_2$ and cloud-based audio feature module $113_2$ may operate similarly to visual feature module $112_1$ and audio feature module $113_1$, respectively, except that the cloud-based counterparts may have more resources at their disposal. In particular, cloud-based visual feature module $112_2$ and cloud-based audio feature module $113_2$ may detect visual features and audio features that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "truck" node may be connected (e.g., as a child) to a "vehicle" node, which in turn may be connected (e.g., as a child) to a "transportation" node. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

Intent matcher 135 may use various techniques to determine an intent of the user, e.g., based on output from natural language processor 122 (which may include annotations and terms of the natural language input) and/or based on output from visual feature module (e.g., $112_1$ and/or $112_2$). In some implementations, intent matcher 135 may have access to one or more databases (not depicted) that include, for instance, a plurality of mappings between grammars, visual features, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?".

In addition to or instead of grammars (which will alternatively be referred to herein as "templates" in some cases), in some implementations, intent matcher 135 may employ one or more trained machine learning models, alone or in combination with one or more grammars and/or visual features. These trained machine learning models may also be stored in one or more databases and may be trained to identify intents, e.g., by embedding data indicative of a user's utterance and/or any detected user-provided visual features into a reduced dimensionality space, and then determining which other embeddings (and therefore, intents) are most proximate, e.g., using techniques such as Euclidean distance, cosine similarity, etc.

Some grammars have slots that can be filled with slot values for "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual features detected by visual feature modules $112_{1-2}$. For example, a user could utter something like "Order me this many dog bowls" while holding up three fingers to visual sensor 107 of client device 106. Or, a user could utter something like "Find me more movies like this" while holding of a DVD case for a particular movie.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator 126, which may generate natural language output based on the fulfillment information.

Fulfillment (or "resolution") information may take various forms because an intent can be fulfilled (or "resolved") in a variety of ways. Suppose a user requests pure information, such as "Where is the new movie by <director> premiering?" The intent of the user may be determined. e.g., by intent matcher 135, as being a search query. The intent and content of the search query may be provided to fulfillment module 124, which as depicted in FIG. 1 may be in communication with one or more search modules 130 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 130. Search module 130 may provide responsive information, such as a date and time, or other more explicit information, such as "<Movie title> will be showing at <local cinema> starting next Friday." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, operating a smart appliance, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
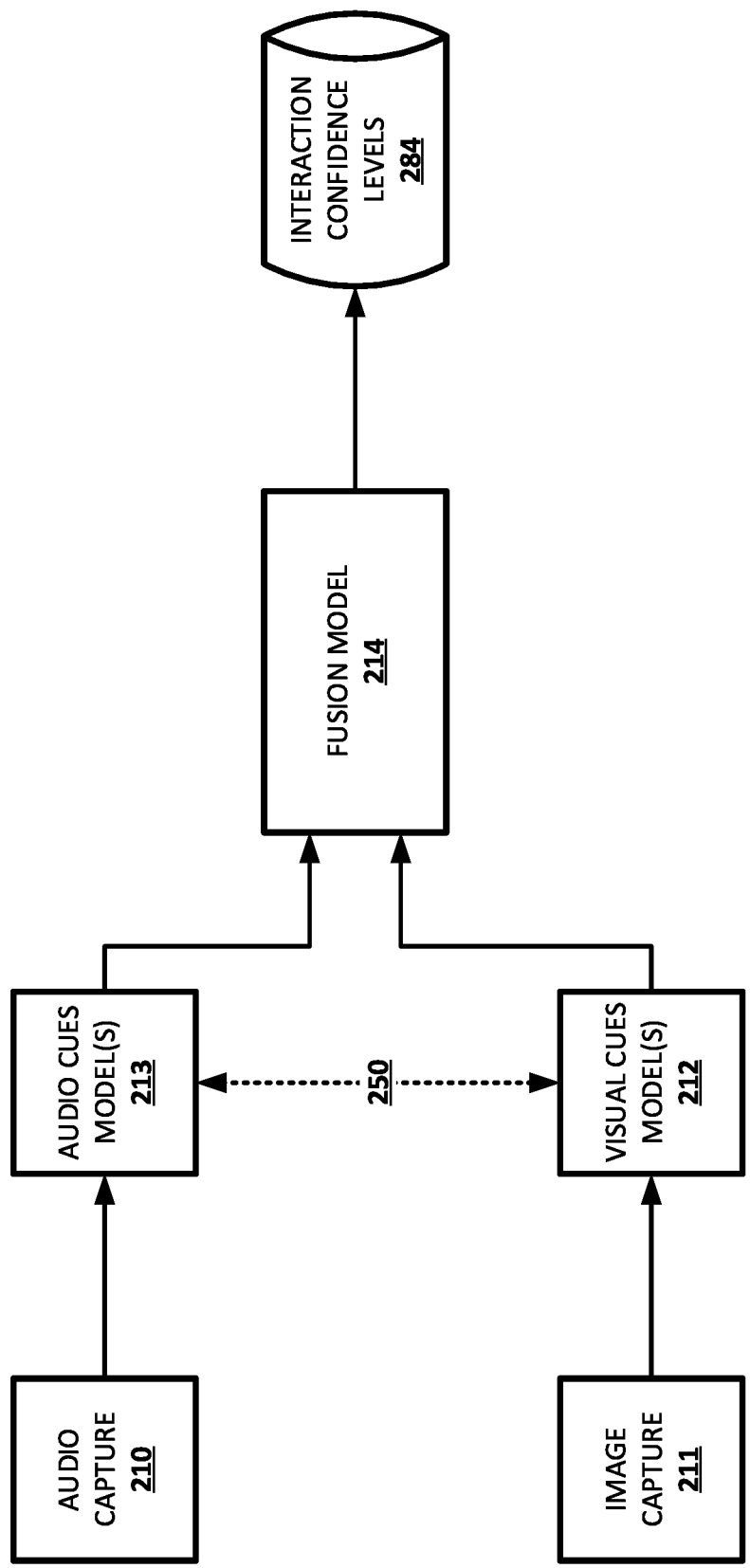
FIG. 2 depicts an example process flow demonstrating various aspects of the present disclosure, in accordance with various implementations.

Automated assistant 120 may be invoked to perform one or more automated assistant functions in various ways, depending on the functionality available at client device 106 and/or at speech capture module 110. FIG. 2 schematically depict an example pipeline for invoking automated assistant 120 to cause automated assistant 120 to perform a responsive automated assistant function.

FIG. 2 depicts an example process flow demonstrating various aspects of the present disclosure, in accordance with various implementations.

As depicted in FIG. 2, audio data is captured or received by audio capture unit 210, such as audio capture module 110 of client device 106. Audio capture unit 210 may include or communicate with various corresponding components as described with respect to FIG. 1. For example, audio capture unit 210 may include, comprise, or communicate with one or more microphones 109 and/or audio capture module 110 of client device 106. In some implementations, audio capture unit 210 may reside in whole or in part on the cloud rather than wholly on the client device 106. In such implementations, audio capture unit 210 may communicate with one or more components of the client device 106 over network 115.

Likewise, image frame(s) is captured or received by image capture unit 211, such as image capture module 111 of client device 106. Image capture unit 211 may include or communicate with various corresponding components as described with respect to FIG. 1. For example, image capture unit 211 may include, comprise, or communicate with one or more vision sensors 107 and/or image capture module 111 of client device 106. In some implementations, image capture unit 211 may reside in whole or in part on the cloud rather than wholly on the client device 106. In such implementations, image capture unit 211 may communicate with one or more components of the client device 106 over network 115.

Once the audio data is captured or received by audio capture unit 210, audio capture unit 210 provides the audio data to one or more audio features models 213. Audio features model(s) 213 may be included in or in communication with various corresponding components as described with respect to FIG. 1. For example, one or more of audio features models 213 may be included in on-device audio feature module 113$_1$ and/or cloud-based audio feature module 113$_2$. As another example, one or more of audio features models 213 may be stored in one or more on-device or off-device databases that one or both of the audio feature modules 113 have access to, such as database 183. Audio features model(s) 213 may include one or more neural networks that can be used to process the audio data as input and generate, as output(s), voice activity data including one or more of: audio spectrograms corresponding to the audio data, a predicted direction or location of a user who provided voice activity relative to the client device 106, audio spectrograms corresponding to human speech detected in the audio data, voice recognition data (e.g., a temporary voice profile to compare to one or more known voice profiles and/or confidence level(s) for such a temporary voice profile matching the known voice profile(s)), and speech recognition data (e.g., one or more transcriptions or various types of data resulting from natural language processing of such transcription(s)).

The image frames captured or received by image capture unit 211 are likewise provided to one or more visual features models 212. Visual features model(s) 212 may be included in or in communication with various corresponding components as described with respect to FIG. 1. For example, one or more of visual features models 212 may be included in on-device visual feature module 112$_1$ and/or cloud-based visual feature module 112$_2$. As another example, one or more of visual features models 212 may be stored in one or more on-device or off-device databases that one or both of the visual feature modules 112 have access to, such as database 182. Visual features model(s) 212 may include one or more neural networks that can be used to process the image frame(s) and generate, as output(s), visual feature data including indications of o: one or more bounding boxes corresponding to portions of the image frame(s), a predicted direction or location of a user who provided voice activity relative to the client device 106, image recognition data (e.g., object recognition data, gaze direction data, etc.), indications of changes in visual features between the image frame(s) (e.g., user physical gestures, user mouth or lip movements, or changes in gaze direction, user position or pose, distance or proximity to a user, etc.), and/or face recognition data (e.g., a temporary face recognition profile to compare to one or more known face recognition profiles and/or confidence level(s) for such a temporary face recognition profile matching the known face recognition profile(s)).

In some implementations, one or more of the outputs of the visual features models 212 may be provided to the audio features models 213, or vice versa, as shown at 250. In such cases, one or more of the audio features models 213 and the visual features models 212 may be used to process this data in generating one or more outputs. For example, one or more of the visual features models 212 may provide indications of user face recognition profiles and gaze directions recognized in the image frame(s), and one or more of the audio features models 213 may be used to process these indications in performing voice recognition. Thus, a particular user voice profile may be more likely to be determined to correspond to the audio data when that user has been determined to be present in corresponding image frame(s) based on the image and face recognition data indicating that the particular user was present in the image frames and gazing at the client device 106 when the voice activity was captured.

The outputs of the audio features model(s) 213 and the visual features model(s) 212 are provided to the fusion model 214, as depicted in FIG. 2. Fusion model 214 may be accessible by corresponding components as described with respect to FIG. 1. For example, fusion model 214 may be accessible to on-device interaction confidence engine 114A and/or cloud-based interaction confidence engine 114B. As another example, fusion model 214 may be stored in one or more on-device or off-device databases that one or both of the interaction confidence engines 114 have access to, such as database 184.

In some implementations, audio features model(s) 213, visual features model(s) 212, and fusion model 214 may be included in one neural network or in multiple neural networks e.g., an ensemble) that are interconnected. Thus, for example, audio features model(s) 213 may constitute an audio processing portion or branch of the neural network(s) and include one or more layers trained to detect the audio features, visual features model(s) 212 may constitute a visual processing portion or branch of the neural network(s) and include one or more layers trained to detect visual features, and fusion model 214 may constitute one or more fusion layers of the neural network(s) trained to analyze the audio and visual features together in order to determine interaction confidence levels 284 for each of the users represented by the features.

Fusion model 214 is trained to process the outputs of audio features model(s) 213 and visual features model(s) 212 to determine one or more users that are captured by the audio data and/or the image frame(s) and to determine an interaction confidence level 284 for each such user that indicates a level of confidence that a given user is intending to interact with automated assistant 120 (and/or content provided by automated assistant 120) at a given time. For example, an interaction confidence level for a user may be higher when voice recognition data and face recognition data indicate that the same user was captured by the audio data and the image frame(s), when voice activity is provided while the user is gazing at the client device 106, when the recognized user provides an invocation phrase, or when the user gazes at the client device 106 and then begins moving in the direction of the client device 106. As another example, an interaction confidence level for that user may be lower when he is determined to be present in the audio data but not the corresponding image frame(s), when voice activity is provided while the user is gazing in another direction other than the direction of the client device 106, or when the user turns around and begins walking away from the client device 106.

In some implementations, audio features model(s) 213, visual features model(s) 212, and/or fusion model 214 may additionally receive various types of data from automated assistant 120 indicating past/present/future dialog states of automated assistant 120, content currently or recently provided by automated assistant 120 to one or more users, user profile data (e.g., face or voice recognition profiles, user interest or preference profiles, user interaction profiles detailing particular audio and/or visual features frequently used by the user, etc.), user device or application history (e.g., search logs, browsing history, commonly used applications and/or their commonly used functions, etc.), interaction confidence levels for users during one or more past time periods, and information from one or more external servers or databases (e.g., as gathered by one or more other components of automated assistant 120 over the internet). These various types of data received from automated assistant 120 may be applied as inputs to one or more layers of these neural network model(s). These neural network model(s) may be trained to use this data to better recognize when a user is intending to interact with automated assistant 120 (e.g., when a user starts dancing after automated assistant 120 initiates playback of a song on client device 106).

For example, these various types of data obtained from automated assistant 120 may be provided as additional inputs to fusion model 214. Fusion model 214 may then use some or all of the data to determine the interaction confidence levels 284 for the users. In this example instance, a first user may ask automated assistant 120 to "play <artist>" and then subsequently, while music by <artist> is playing, a second user may gaze at the first user and says "Can you make it any louder?". Even though the second user is not gazing at the client device 106 and "Can you make it any louder?" does not include a hotword or invocation phrase, the second user may be assigned a high interaction confidence level based on the second user interacting with the first user who currently has a high interaction confidence level, and further based on the correlation between their speech and the recent automated assistant 120 content provided and/or action performed. Thus, the second user may be determined to be participating in the ongoing or recent interaction between the first user and automated assistant 120 based on the second user interacting with the first user and based on the content of their interaction being associated with the content of the ongoing or recent interaction between the first user and automated assistant 120.

Interaction confidence levels 284 may be stored in one or more on-device databases, such as database 184, or may be stored in one or more external databases accessible to automated assistant 120. Automated assistant 120 may use interaction confidence levels 284 to determine whether or not to invoke particular automated assistant functions in response to particular audio or visual interaction cues from the user. Automated assistant 120 may compare an interaction confidence level to a threshold, or to one or more other criteria. When an interaction confidence level meets or otherwise satisfies the relevant threshold or criteria, then automated assistant 120 can determine that the user intended to interact with automated assistant 120 and perform one or more automated assistant functions in response. For instance, continuing the example with two users stated above, automated assistant 120 may increase the volume of the music that is playing. Alternatively or additionally, automated assistant 120 may record an indication, e.g., in a user profile that corresponds to the second user, that the second user prefers music to be played at a particular volume. Likewise, when an interaction confidence level fails to satisfy the relevant threshold or criteria, then automated assistant 120 can determine that the user did not intend to interact with automated assistant 120 and may determine not to perform one or more automated assistant functions in response.

In some implementations, automated assistant 120 may track historical interaction confidence levels 284 over time and across several interactions. In such implementations, automated assistant 120 may use the historical interaction confidence levels 284 to determine various thresholds for that user invoking automated assistant 120 based on their interaction confidence levels 284. For example, automated assistant 120 may determine that a lower level of confidence is required for a particular user to invoke a function of automated assistant 120 at a given time when no other user has been detected for some time (e.g., user appears to be alone) and/or when the voice activity of that particular user corresponds to an automated assistant 120 command that the particular user often provides in similar contexts (e.g., speech that most often occurs when a high level of confidence is indicated, as may be the case when the user rarely speaks the command when not addressing automated assistant 120).

In some implementations, interaction confidence levels 284 may be determined for an entire interaction, a series of interactions, or a type of interaction rather than merely for discrete time periods. In such implementations, a given user may be assigned an interaction confidence level that is adjusted as the interaction continues or progresses. In some other implementations, interaction confidence levels 284 may be determined for discrete time intervals and automated assistant 120 may determine, based on the context, whether and how to take the user's historical interaction confidence levels 284 into account for determining whether the user intended to interact with automated assistant 120 (and/or another user, as is described below). For example, automated assistant 120 may determine that a user's current interaction confidence level need only satisfy a lower threshold and/or more basic set of criteria to trigger one or more automated assistant functions when that user's N most recent historical interaction confidence levels 284 satisfy another threshold and/or more complex set of criteria.

In various implementations, interaction confidence levels 284 of the users may be determined both for interacting with automated assistant 120 (and/or content provided by automated assistant 120) as well as for interacting with other users who are present in the environment of the users. For example, a given user may be assigned a first interaction confidence level that indicates a level of confidence that the user intended to interact with the automated assistant and may also be assigned one or more other interaction confidence levels that indicate a level of confidence that the user intended to interact with one or more other users. Automated assistant 120 can compare those other interaction confidence levels to another threshold, or set of criteria, to determine if the user is interacting with another user.

In such implementations, whether and/or which automated assistant functions are performed may depend on both sets of interaction confidence levels, in the case where a given user is assigned both. Thus, automated assistant 120 may only perform the one or more automated assistant functions or may only perform certain automated assistant functions based on the two types of interaction confidence levels and/or the relationship between the two types of interaction confidence levels. For example, automated assistant 120 may only perform "background operations" (e.g., automated assistant functions that are determined to be unlikely to disturb the interaction between the users) when, for instance, a given user has an interaction confidence level with another user that satisfies one threshold but an interaction confidence level with automated assistant 120 that fails to satisfy another threshold (or vice versa), when the difference between the interaction confidence levels fails to satisfy yet another threshold, and/or when the interaction confidence level with another user is higher than the interaction confidence level with automated assistant 120. As another example, automated assistant 120 may not perform any responsive automated assistant functions based on detecting a given user's speech and/or gestures when their interaction confidence level with another user is higher than their interaction confidence level with automated assistant 120.

In some implementations, a given user's interaction confidence level with respect to another user may be used to adjust the threshold or criteria used for triggering one or more automated assistant functions based on the user's interaction confidence level with automated assistant 120. For example, automated assistant 120 may require a user's interaction confidence level with automated assistant 120 to indicate a higher level of confidence to trigger the one or more automated assistant functions and/or certain automated assistant functions when that user is indicated as having an interaction confidence level with another user, or when the level of confidence that the user intended to interact with the other user meets certain criteria.

Figure 3:
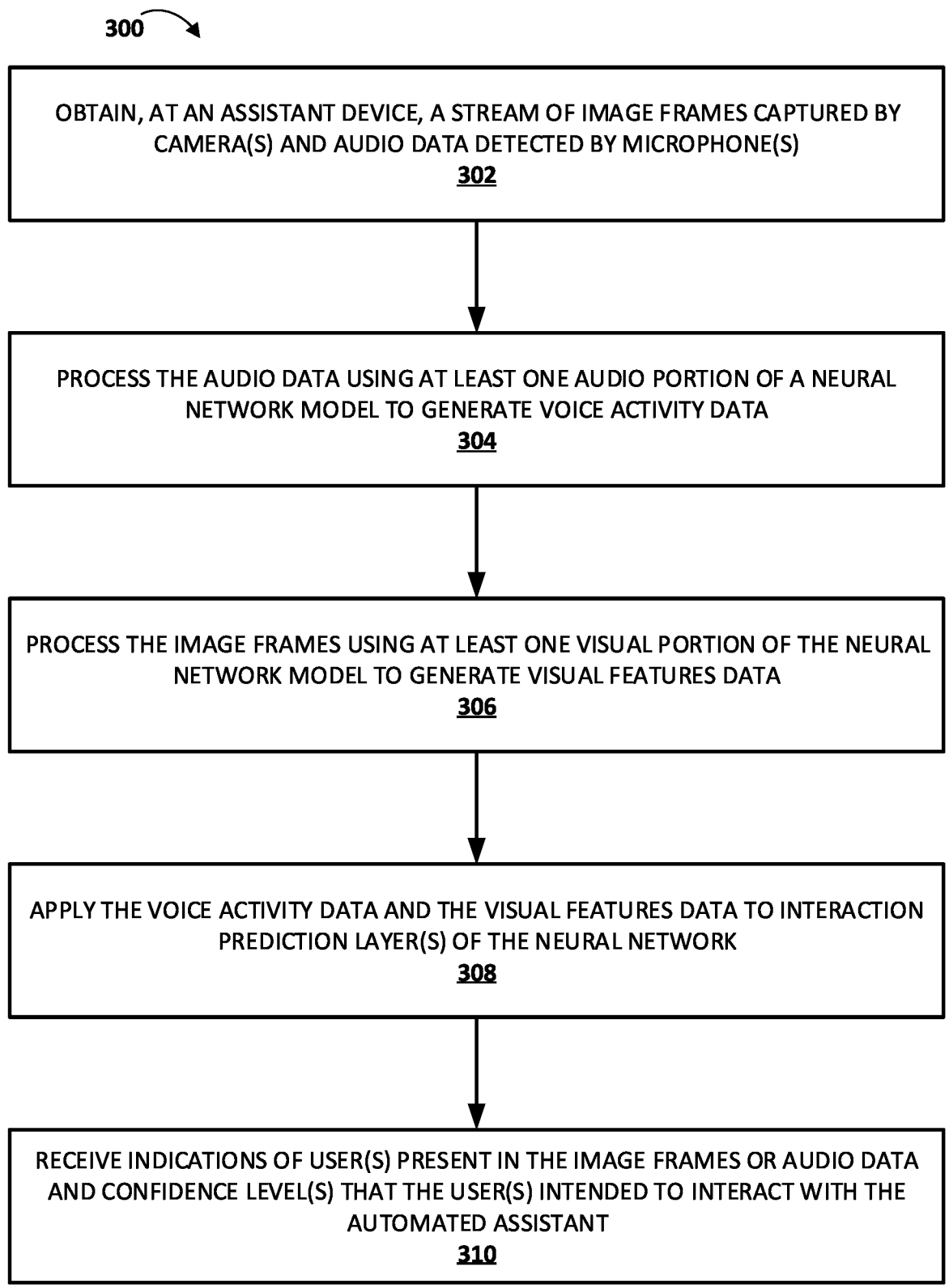
FIG. 3 is a flowchart illustrating an example method according to implementations disclosed herein.

FIG. 3 is a flowchart illustrating an example method 300 according to implementations disclosed herein. For convenience, the operations of the flow charts of FIG. 3 are described with reference to a system that performs the operations. This system may include various components of various computer systems, such as one or more components of computing system(s) that implement automated assistant 120 (e.g., a client device and/or remote computing system(s)), as disclosed above with respect to FIGS. 1 and 2. Moreover, while operations of method 300 are shown in a particular order, this is not meant to be limiting. One or more operations may be reordered, omitted or added.

At block 302, the system obtains, at an assistant device, a stream of image frames captured by one or more cameras and audio data detected by one or more microphones of the assistant device. In some implementations, the camera(s) can be integrated with a client device, such as client device 106, that includes an assistant client, such as automated assistant client 108. In some implementations, the camera(s) can be separate from, but in communication with, the client device. For example, the camera(s) can include a standalone smart camera that is in wired and/or wireless communication with a client device that includes an automated assistant client.

At block 304, the system processes the audio data using at least one audio portion of a neural network model to generate voice activity data. As disclosed herein, the voice activity data may include several forms of data characterizing the voice activity detected in the audio data. For example, the voice activity data may include audio spectrograms corresponding to the audio data, a predicted direction or location of a user who provided voice activity relative to the client device 106, audio spectrograms corresponding to human speech detected in the audio data, voice recognition data (e.g., a temporary voice profile to compare to one or more known voice profiles and/or confidence level(s) for such a temporary voice profile matching the known voice profile(s)), and/or speech recognition data (e.g., one or more transcriptions or various types of data resulting from natural language processing of such transcription(s)).

At block 306, the system processes the image frames using at least one visual portion of a neural network model to generate visual features data. As disclosed herein, the visual features data may include several forms of data characterizing the visual features detected in the image frames. For example, the visual features data may include indications of: one or more bounding boxes corresponding to portions of the image frame(s), a predicted direction or location of a user who provided voice activity relative to the client device 106, image recognition data (e.g., object recognition data, gaze direction data, etc.), indications of changes in visual features between the image frame(s) (e.g., user physical gestures, user mouth movements, or changes in gaze direction, user position or pose, distance or proximity to a user, etc.), and/or face recognition data (e.g., a temporary face recognition profile to compare to one or more known face recognition profiles and/or confidence level(s) for such a temporary face recognition profile matching the known face recognition profile(s)).

At block 308, the system applies the voice activity data and the visual features data to one or more interaction prediction layers of the neural network model. As disclosed herein, these interaction prediction layers may act as temporal and/or spatial fusion layers trained to process the voice activity data and the visual features data, as well as the temporal and/or spatial relationships between various portions of the voice activity data and the visual features data. The interaction prediction layer(s) may take the voice activity data and the visual features data as inputs and return, as outputs, indications of users determined to be present in the image frames and/or the audio data and confidence levels, for each of the present users, that indicate a predicted level of confidence that a given present user intended to interact with the automated assistant during the time period corresponding to their presence in the image frames and the audio data.

At block 310, the system receives the indications of one or more users determined to be present in the image frames or the audio data and the interaction confidence levels for each user that characterize a level of confidence that a given user intended to interact with the automated assistant during the time period corresponding to their presence in the image frames and the audio data. As disclosed herein, automated assistant 120 may use these indications and interaction confidence levels to determine whether to perform one or more automated assistant functions. For example, automated assistant 120 may determine, and perform, one or more automated assistant functions to perform in response to user-provided voice activity and/or visual features when a given user who provided the voice activity and/or visual features has a high interaction confidence level assigned to them during the time period correlating to the user-provided voice activity and/or visual features. However, if the user has a low interaction confidence level assigned to them, then automated assistant 120 may not determine one or more automated assistant functions to perform and/or may not perform such functions. In some implementations, automated assistant 120 may compare the interaction confidence levels for the users to one or more thresholds or criteria, and only when those interaction confidence levels satisfy those thresholds or criteria will automated assistant 120 determine the one or more automated assistant functions to perform, and/or perform those functions.

Figure 4:
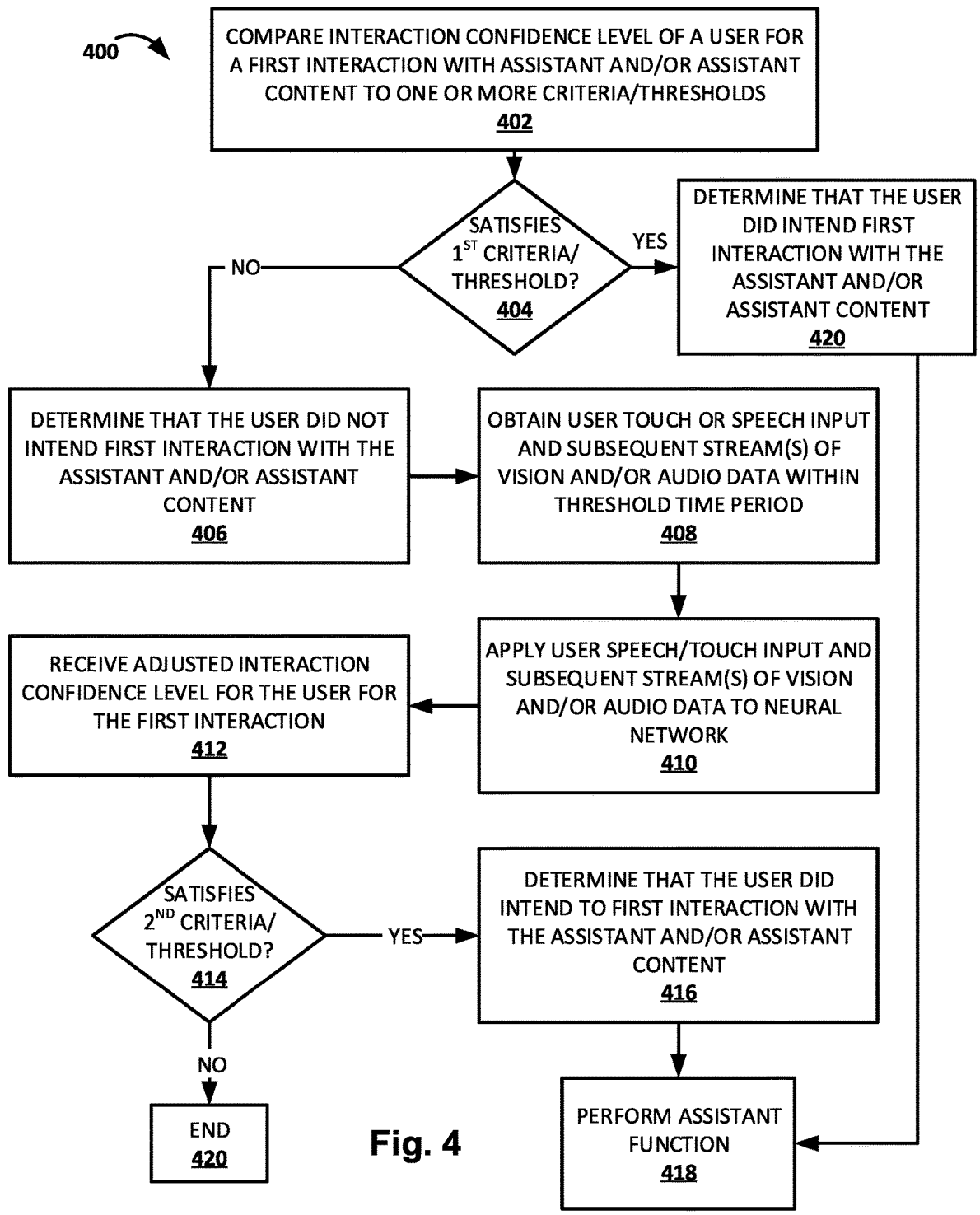
FIG. 4 is a flowchart illustrating another example method according to implementations disclosed herein.

FIG. 4 is a flowchart illustrating an example method 400 according to implementations disclosed herein. For convenience, the operations of the flow charts of FIG. 4 are described with reference to a system that performs the operations. This system may include various components of various computer systems, such as one or more components of computing system(s) that implement automated assistant 120 (e.g., a client device and/or remote computing system(s)), as disclosed above with respect to FIGS. 1-3. Moreover, while operations of method 400 are shown in a particular order, this is not meant to be limiting. One or more operations may be reordered, omitted or added.

At block 402, the system compares the interaction confidence level of a user for a first interaction with automated assistant 120 and/or automated assistant-provided content to one or more criteria or thresholds. The particular user whose interaction confidence level is compared to the one or more criteria or thresholds may be one of many users determined to be present in the image frame(s) and/or audio data corresponding to a particular time period. The system will thus compare the interaction confidence level of this particular user to the threshold(s) or criteria to determine if that particular user intended to engage in an interaction with automated assistant 120 during that time period.

At block 404, the system determined whether the interaction confidence level of the user satisfied the one or more criteria or thresholds. If the interaction confidence level of the user failed to satisfy the one or more criteria or thresholds, then the system proceeds to block 406. If the interaction confidence level of the user did satisfy the one or more criteria or thresholds, then the system proceeds to block 420.

At block 406, the system determines that the user did not intend to perform a first interaction with automated assistant 120 and/or automated assistant-provided content during the time period corresponding to the processing image frame(s) and/or audio data. The system makes this determination based on the interaction confidence level of the user failing to satisfy the one or more criteria or thresholds of block 404.

At block 408, the system obtains or otherwise receives, user interface input in the form of touch input or speech input, as well as new streams of image frames and/or audio data captured after the initial streams of such data used to determine the interaction confidence level for the user. This user interface input and these new streams of image frames and/or audio data may be obtained or received by the client device (e.g., client device 106) within a threshold time period subsequent to determining that the user did not intend to perform a first interaction with automated assistant 120 and/or automated assistant-provided content during the first interaction time period.

At block 410, the system applies the user speech or touch input and the newly obtained stream(s) of image frames and/or audio data as inputs to one or more layers of a neural network model. As discussed above with respect to block 408, the newly obtained stream(s) of image frames and/or audio data capture the user during the time period when the user provided the speech or touch input.

At block 412, the system receives, as output(s) from the neural network model, an adjusted interaction confidence level for the user for the time period of the image frames and/or audio data corresponding to the first potential interaction between the user and automated assistant 120 and/or assistant-provided content.

At block 414, the adjusted interaction confidence level for the user for the first potential interaction between the user and automated assistant 120 and/or assistant-provided content is compared to one or more additional criteria or thresholds. In some implementations, these criteria or thresholds may be the same as the criteria or thresholds used at block 404. In other implementations, the additional criteria or thresholds used at block 414 may be different than the ones used at block 404. If the adjusted interaction confidence level for the user satisfies the additional criteria or thresholds of block 414, then the system proceeds to block 416. If the adjusted interaction confidence level for the user fails to satisfy the additional criteria or thresholds of block 414, then the system proceeds to block 420 where the process ends.

At block 416, the system determines that the user did intend to perform the first interaction with automated assistant 120 and/or automated assistant-provided content. The system makes this determination based on the adjusted interaction confidence level of the user satisfying the one or more additional criteria or thresholds of block 414.

At block 418, the system performs one or more automated assistant functions that corresponds to the speech and/or physical gestures provided by the user at the time of the first interaction.

At block 420, the system determines that the user did intend to engage in the first interaction with automated assistant 120 and/or content currently or recently provided by automated assistant 120 when the initial streams of audio data and image frames were captured. The system makes this determination based on the interaction confidence level of the user satisfying the first one or more criteria or thresholds used at block 404.

After the system makes the determination at block 420, the system proceeds to block 418 to perform the one or more automated assistant functions that correspond to the speech and/or physical gestures provided by the user during the first interaction.

An example implementation of FIG. 4 follows.

A user may provide initial speech input of "turn it up", which excludes a hotword configured to invoke automated assistant 120 to perform one or more automated assistant functions. The system may determine an interaction confidence level for the user based on the image frames and/or audio data that capture the user in the time period corresponding to their "turn it up" input. In some implementations, the system may further determine this interaction confidence level of the user based on content provided by automated assistant 120 recently or during the time when the audio data and/or image frames of the user were captured. When that interaction confidence level fails to satisfy one or more first criteria or thresholds, then the system will determine that the user did not intend to interact with automated assistant 120 and/or the content currently or recently provided by automated assistant 120 at the client device. Thus, the system will not perform one or more automated assistant functions based on the initial "turn it up" speech input provided by the user.

Subsequently, but within a threshold amount of time (e.g., 10 seconds, 1 minute, etc.) the user may walk towards the client device, perhaps select a hardware button configured to invoke automated assistant 120, and provide second speech input of "I said, turn the volume up!" The system then obtains or otherwise receives indications of this new touch input and speech input, as well as the audio data capturing the second speech input and the newly captured image frames showing the user being close to the client device or approaching the client device. The system will apply these indications of user speech and touch input as well as the newly captured audio data and image frames as inputs to one or more layers of the neural network model in order to receive, as output, an adjusted interaction confidence level for the user for the time period corresponding to the initial "turn it up" speech input.

When the adjusted interaction confidence level of the user then satisfies the second set of criteria and/or threshold(s), then the system will determine that the user originally intended to interact with automated assistant 120 and/or content currently or recently provided by automated assistant 120 when the initial "turn it up" speech input was provided by the user. In response to this determination, the system may perform one or more automated assistant functions based on the initial "turn it up" speech input. In such an example, such functions could include increasing the volume of music currently playing on the client device, noting that this user is interested in this song/artist/genre/etc. in their user interest profile, and/or "liking" the song in a music application executing at the client device and providing the music that is or was playing when the user provided their initial speech input. In some implementations, this subsequent interaction may be used as a training example to train one or more machine learning models described herein, e.g., as part of the federated learning mentioned previously.

Figure 5:
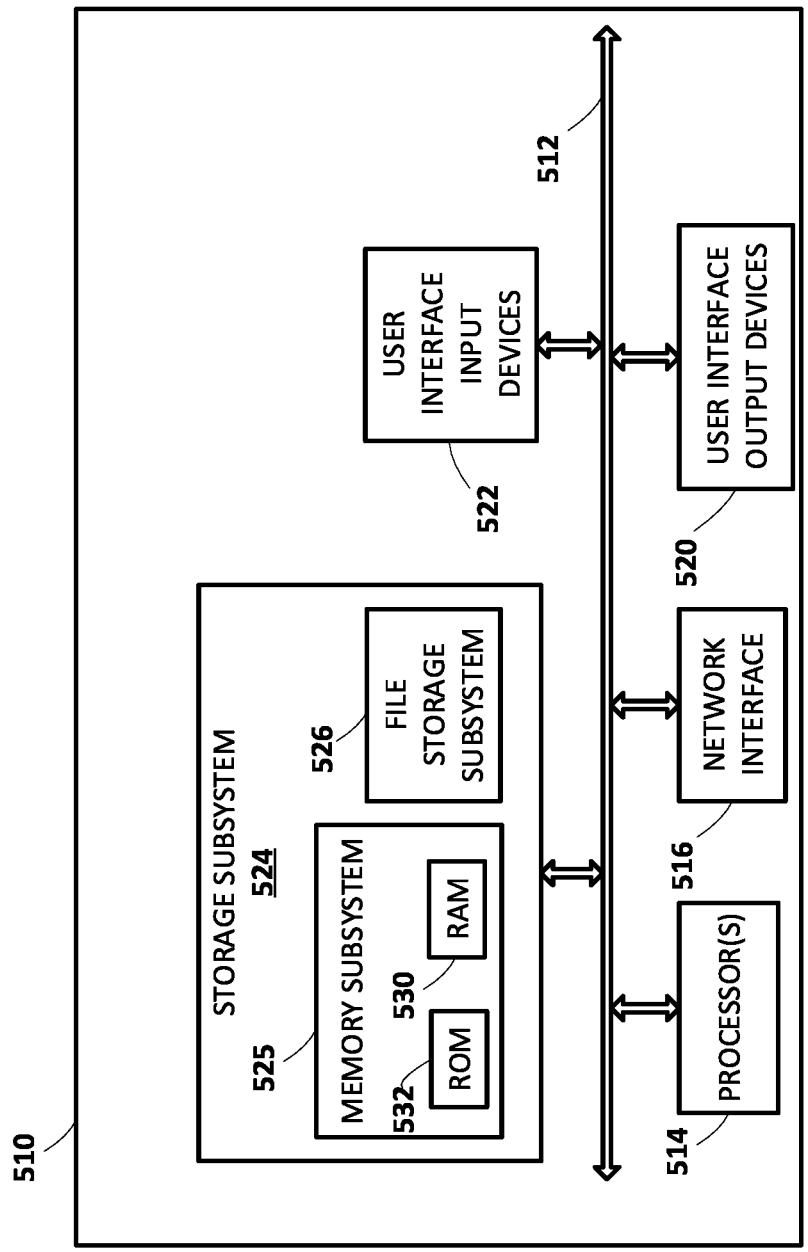
FIG. 5 is a block diagram of an example computer system that may be utilized to perform one or more aspects of techniques described herein.

FIG. 5 is a block diagram of an example computer system 510 that may be utilized to perform one or more aspects of techniques described herein.

Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, method 500, and/or to implement one or more of computing device 110, automated assistant 112, mode selection engine 114, server device 224, client device 206, server computing device 326, client computing device 302, docking apparatus 336, and/or any other device, application, and/or operation discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, comprising:
    executing an automated assistant at least in part on an assistant device;
    obtaining, at the assistant device:
        one or more image frames of a stream of image frames captured by one or more cameras, and
        audio data detected by one or more microphones of the assistant device, wherein the audio data includes data indicative of one or more spoken utterances;
    processing the audio data using one or more neural network models to generate voice activity data indicating voice activity detected in the audio data;
    processing the one or more image frames using one or more of the neural network models to generate visual feature data indicating one or more visual features present in the image frames of the stream of image frames;
    processing, using one or more of the neural network models, the voice activity data and the visual feature data, to receive indications of:
        a first confidence level for each individual, of multiple individuals, determined to be present in the stream of image frames or the audio data, each of the first confidence levels indicating a level of confidence that a corresponding individual intended to interact with the automated assistant, and a second confidence level for each individual, each of the second confidence levels indicating a level of confidence that the corresponding individual intended to interact with another individual of the multiple individuals; and conditionally causing the automated assistant to provide content responsive to one or more of the spoken utterances based on a determination of whether the first and second confidence levels of one or more of the multiple individuals determined to be present in the stream of image frames or the audio data satisfy one or more criteria, wherein the one or more criteria comprise a difference between the first and second confidence levels for a given individual satisfying a threshold.

2. The method of claim 1, wherein the one or more criteria include the second confidence level for a given individual being greater than the first confidence level for the given individual.

3. The method of claim 1, wherein the one or more criteria include a relationship between the first and second confidence levels.

4. The method of claim 1, further comprising conditionally causing the automated assistant to perform one or more background operations based on a determination that the first or second confidence levels of one or more of the multiple individuals satisfy a different criterion.

5. The method of claim 1, wherein the voice activity data includes voice recognition data and wherein the visual feature data includes facial recognition data.

6. The method of claim 1, wherein the visual feature data indicates a change in visual features between two or more consecutive image frames of the stream of image frames.

7. The method of claim 6, wherein the change in the visual features between the two or more consecutive image frames of the stream of image frames is determined to correspond to:
- lip movements of at least one user of the users;
- a change in proximity of at least one of the users with respect to the assistant device;
- a change in direction of gaze of at least one of the users;
- a recognized physical gesture performed by at least one of the users; and
- an interaction between at least one of the users and an additional user, the additional user being one of the one or more users that are determined to be present in the image frames of the stream of image frames, or a different user.

8. A system comprising one or more processors and memory storing instructions that, in response to execution by the one or more processors, cause the one or more processors to:
- execute an automated assistant at least in part on an assistant device;
- obtain, at the assistant device:
  - one or more image frames of a stream of image frames captured by one or more cameras, and
  - audio data detected by one or more microphones of the assistant device, wherein the audio data includes data indicative of one or more spoken utterances;
- process the audio data using one or more neural network models to generate voice activity data indicating voice activity detected in the audio data;
- process the one or more image frames using one or more of the neural network models to generate visual feature data indicating one or more visual features present in the image frames of the stream of image frames;
- process, using one or more of the neural network models, the voice activity data and the visual feature data, to receive indications of:
  - a first confidence level for each individual, of multiple individuals, determined to be present in the stream of image frames or the audio data, each of the first confidence levels indicating a level of confidence that a corresponding individual intended to interact with the automated assistant, and
  - a second confidence level for each individual, each of the second confidence levels indicating a level of confidence that the corresponding individual intended to interact with another individual of the multiple individuals; and
- conditionally cause the automated assistant to provide content responsive to one or more of the spoken utterances based on a determination of whether the first and second confidence levels of one or more of the multiple individuals determined to be present in the stream of image frames or the audio data satisfy one or more criteria, wherein the one or more criteria comprise a difference between the first and second confidence levels for a given individual satisfying a threshold.

9. The system of claim 8, wherein the one or more criteria include the second confidence level for a given individual being greater than the first confidence level for the given individual.

10. The system of claim 8, wherein the one or more criteria include a relationship between the first and second confidence levels.

11. The system of claim 8, further comprising instructions to conditionally cause the automated assistant to perform one or more background operations based on a determination that the first or second confidence levels of one or more of the multiple individuals satisfy a different criterion.

12. The system of claim 8, wherein the voice activity data includes voice recognition data and wherein the visual feature data includes facial recognition data.

13. The system of claim 8, wherein the visual feature data indicates a change in visual features between two or more consecutive image frames of the stream of image frames.

14. The system of claim 13, wherein the change in the visual features between the two or more consecutive image frames of the stream of image frames is determined to correspond to:
- lip movements of at least one user of the users;
- a change in proximity of at least one of the users with respect to the assistant device;
- a change in direction of gaze of at least one of the users;
- a recognized physical gesture performed by at least one of the users; and
- an interaction between at least one of the users and an additional user, the additional user being one of the one or more users that are determined to be present in the image frames of the stream of image frames, or a different user.

15. At least one non-transitory computer-readable medium comprising instructions that, in response to execution by one or more processors, cause the one or more processors to:
- execute an automated assistant in at least in part on an assistant device;
- obtain, at the assistant device:
  - one or more image frames of a stream of image frames captured by one or more cameras, and audio data detected by one or more microphones of the assistant device, wherein the audio data includes data indicative of one or more spoken utterances;

process the audio data using one or more neural network models to generate voice activity data indicating voice activity detected in the audio data;

process the one or more image frames using one or more of the neural network models to generate visual feature data indicating one or more visual features present in the image frames of the stream of image frames;

process, using one or more of the neural network models, the voice activity data and the visual feature data, to receive indications of:
- a first confidence level for each individual, of multiple individuals, determined to be present in the stream of image frames or the audio data, each of the first confidence levels indicating a level of confidence that the corresponding individual intended to interact with the automated assistant, and
- a second confidence level for each individual, each of the second confidence levels indicating a level of confidence that the corresponding individual intended to interact with another individual of the multiple individuals; and conditionally cause the automated assistant to provide content responsive to one or more of the spoken utterances based on a determination of whether the first and second confidence levels of one or more of the multiple individuals determined to be present in the stream of image frames or the audio data satisfy one or more criteria, wherein the one or more criteria comprise a difference between the first and second confidence levels for a given individual satisfying a threshold.

16. The at least one non-transitory computer-readable medium of claim 15, wherein the one or more criteria include the second confidence level for a given individual being greater than the first confidence level for the given individual.

17. The at least one non-transitory computer-readable medium of claim 15, wherein the one or more criteria include a relationship between the first and second confidence levels.

* * * * *